US011213810B1

(12) United States Patent
Ding et al.

(10) Patent No.: US 11,213,810 B1
(45) Date of Patent: Jan. 4, 2022

(54) METHOD OF PRODUCING A CRACKING CATALYST

(71) Applicant: Saudi Arabian Oil Company, Dhahran (SA)

(72) Inventors: Lianhui Ding, Dhahran (SA); Manal Al-Eid, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/921,124

(22) Filed: Jul. 6, 2020

(51) Int. Cl.
| B01J 29/06 | (2006.01) |
| B01J 29/70 | (2006.01) |
| B01J 6/00 | (2006.01) |
| B01J 37/02 | (2006.01) |
| B01J 37/04 | (2006.01) |
| B01J 35/02 | (2006.01) |
| B01J 35/10 | (2006.01) |
| C10G 11/05 | (2006.01) |
| B01J 37/00 | (2006.01) |
| B01J 29/72 | (2006.01) |
| B01J 21/04 | (2006.01) |
| B01J 21/08 | (2006.01) |
| B01J 35/00 | (2006.01) |
| B01J 23/30 | (2006.01) |
| B01J 23/75 | (2006.01) |
| B01J 23/16 | (2006.01) |
| B01J 29/76 | (2006.01) |
| C10G 47/04 | (2006.01) |
| B01J 37/08 | (2006.01) |
| C10G 47/16 | (2006.01) |
| C10G 47/20 | (2006.01) |
| C10G 47/02 | (2006.01) |
| B01J 23/28 | (2006.01) |
| B01J 23/755 | (2006.01) |

(52) U.S. Cl.
CPC ........... *B01J 29/7007* (2013.01); *B01J 6/001* (2013.01); *B01J 21/04* (2013.01); *B01J 21/08* (2013.01); *B01J 23/16* (2013.01); *B01J 23/30* (2013.01); *B01J 23/75* (2013.01); *B01J 29/7215* (2013.01); *B01J 29/7615* (2013.01); *B01J 35/0006* (2013.01); *B01J 35/023* (2013.01); *B01J 35/1019* (2013.01); *B01J 35/1023* (2013.01); *B01J 35/1042* (2013.01); *B01J 35/1047* (2013.01); *B01J 35/1061* (2013.01); *B01J 37/0009* (2013.01); *B01J 37/0018* (2013.01); *B01J 37/0045* (2013.01); *B01J 37/0201* (2013.01); *B01J 37/04* (2013.01); *B01J 37/08* (2013.01); *C10G 11/05* (2013.01); *C10G 47/04* (2013.01); *C10G 47/16* (2013.01); *C10G 47/20* (2013.01); *B01J 23/28* (2013.01); *B01J 23/755* (2013.01); *B01J 2229/20* (2013.01); *B01J 2229/42* (2013.01); *C10G 47/02* (2013.01); *C10G 2300/70* (2013.01)

(58) Field of Classification Search
CPC ... B01J 21/04; B01J 21/08; B01J 23/28; B01J 23/30; B01J 23/75; B01J 23/755; B01J 23/16; B01J 29/7007; B01J 29/7215; B01J 29/7615; B01J 29/7815; B01J 2229/20; B01J 2229/42; B01J 35/023; B01J 35/1023; B01J 35/1061; B01J 35/1042; B01J 35/0006; B01J 35/1019; B01J 37/0045; B01J 37/0201; B01J 37/04; B01J 37/0009; B01J 37/0018; B01J 37/08; B01J 6/001; C10G 11/05; C10G 47/02; C10G 47/04; C10G 47/16; C10G 47/20; C10G 2300/70
USPC ......... 502/60, 63, 64, 66, 67, 69, 70, 74, 79
See application file for complete search history.

(56) References Cited

U.S. PATENT DOCUMENTS

| 5,026,937 | A | | 6/1991 | Bricker | |
| 6,133,186 | A | * | 10/2000 | Gosselink | ............ B01J 29/7007 502/67 |
| 6,762,143 | B2 | | 7/2004 | Shan et al. | |
| 7,550,405 | B2 | | 6/2009 | Shan et al. | |
| 2009/0272674 | A1 | * | 11/2009 | Zheng | .................. B01J 29/7815 208/216 PP |
| 2010/0179361 | A1 | | 7/2010 | Goergen et al. | |
| 2017/0144138 | A1 | | 5/2017 | Arvind et al. | |
| 2017/0291167 | A1 | * | 10/2017 | Ding | ...................... B01J 29/061 |
| 2017/0369397 | A1 | | 12/2017 | Al-Herz et al. | |

(Continued)

FOREIGN PATENT DOCUMENTS

| KR | 101695105 B1 | 1/2017 |
| WO | 2017180458 A1 | 10/2017 |
| WO | WO 2017/180458 | * 10/2017 |

(Continued)

OTHER PUBLICATIONS

Yingxia Li et al., "Transalkylation of Multi-secbutylbenzenes with Benzene over Hierarchical Beta Zeolite", Chinese Journal of Chemical Engineering, 22, 2014, pp. 898-902.*

(Continued)

*Primary Examiner* — Elizabeth D Wood
(74) *Attorney, Agent, or Firm* — Dinsmore & Shohl LLP

(57) ABSTRACT

Embodiments of the present disclosure are directed to a method of producing a cracking catalyst. The method of producing a cracking catalyst may comprise producing a plurality of uncalcined zeolite-beta nanoparticles via a dry-gel method, directly mixing the plurality of uncalcined zeolite-beta nanoparticles with at least one additional hydrocracking component to form a mixture, and calcining the mixture to form the cracking catalyst. The plurality of uncalcined zeolite-beta nanoparticles may have an average diameter of less than 100 nm.

19 Claims, 1 Drawing Sheet

(56) References Cited

U.S. PATENT DOCUMENTS

2018/0333708 A1* 11/2018 Ding .................. B01J 29/7007

FOREIGN PATENT DOCUMENTS

WO    WO 2018/212984    * 11/2018
WO    2020106628 A1    5/2020

OTHER PUBLICATIONS

Matsukata et al., "Crystallization behavior of zeolite beta during steam-asisted crystallization of dry gel", Microporous and Mesoporous Materials, 56, 2002, pp. 1-10.*
Mohammadparast et al., "The synthesis of nano-sized ZSM-5 zeolite by dry gel conversion method and investigating the effects of experimental parameters by Taguchi experimental design", Journal of Experimental Nanoscience, vol. 13, No. 1, 2018, pp. 160-173.*
Rao et al., "Dry-gel conversion technique for synthesis of zeolite BEA", Chem. Commun., 1996, pp. 1441-1442.*
Van Grieken et al., "Anomalous crystallization mechanism in the synthesis of nanocrystalline ZSM-5", Microporous and Mesoporous Materials, 39, 2000, pp. 135-147.*
Camblor et al., "Synthesis of nanocrystalline zeolite Beta in the absence of alkali metal cations", Studies in Surface Science and Catalysis, vol. 105, 1997, pp. 341-348.*
Ding et al., "Nanocrystalline zeolite beta: The effect of template agent on crystal size", Materials Research Bulletin, vol. 42, pp. 584-590, 2007.
Kecht et al., "Nanosized Zeolites Templated by Metal—Amine Complexes", Chemistry of Materials, vol. 19, No. 6, pp. 1203-1205, Mar. 20, 2007.
Lechert, "The mechanism of faujasite growth studied by crystallization kinetics", Zeolites, vol. 17, pp. 473-482, 1996.
Mintova et al., Variation of the Si/Al ratio in nanosized zeolite Beta crystals, Microporous and Mesoporous Matereials, vol. 90, pp. 237-245, 2006.
Naik et al.., "Synthesis of Zeolitic Mesoporous Materials by Dry Gel Conversio under Controlled Humidity", J. Phys. Chem B, vol. 107, pp. 7006-7014, 2003.
Sakthievel et al., "Nanosized B-zeolites with tunable particle sizes: Synthesis by the dry gel conversion (DGC) method in the presence of surfactants, chractereiation and catalytic propeties", Microporous and Mesoporous Materials, vol. 119, pp. 332-330, 2009.
Tsapatsis et al., "Characterization of Zeolite L. Nanoclusters" Chem. Magter, vol. 7, pp. 1734-1741, 1995.
Xia et al., "Crystallizatio kinetics of nanosized TiB zeolites with high oxidation activity by a dry-gel conversion technique", Materials Chemistry and Physics, vol. 89, pp. 89-98, 2005.
International Search Report and Written Opinion dated Apr. 19, 2021 pertaining to International application No. PCT/US2020/052696 filed Sep. 25, 2020, 16 pgs.
Jia, Y. et al. "Hierarchical ZSM-5 zeolite synthesized via dry gel conversion-steam assisted crystallization process and its application in aromatization of methanol", Powder Technology, vol. 328, Apr. 1, 2018, pp. 415-429.
Ding, L. et al. "LCO hydrotreating with Mo—Ni and W—Ni supported on nano- and micro-sized zeolite beta", Applied Catalysis A: General, Elsevier, Amsterdam, NL, vol. 353, No. 1, Jan. 31, 2009, pp. 17-23.
Yue, M. B. et al. Dry-gel synthesis of shaped binderless zeolites composed of nanosized ZSM-5, Solid State Sciences, vol. 20, Jun. 1, 2013, pp. 1-7.
Su, X. F. et al "Conversion of Methanol to Aromatic-Rich Gasoline over High-Efficiency Bifunctional Catalysts: Green Synthesis of GaZSM-5 Zeolites via Dry-Gel Conversion Strategy", Russian Journal of Applied Chemistry, Pleiades Publishing, Moscow, vol. 93, No. 1, Jan. 1, 2020, pp. 127-136.
Office Action dated Jun. 16, 2021 pertaining to U.S. Appl. No. 16/930,462, filed Jul. 16, 2020, 23 pages.
International Search Report and Written Opinion dated Oct. 22, 2021 pertaining to International application No. PCT/US2021/040500 filed Jul. 6, 2021.

* cited by examiner

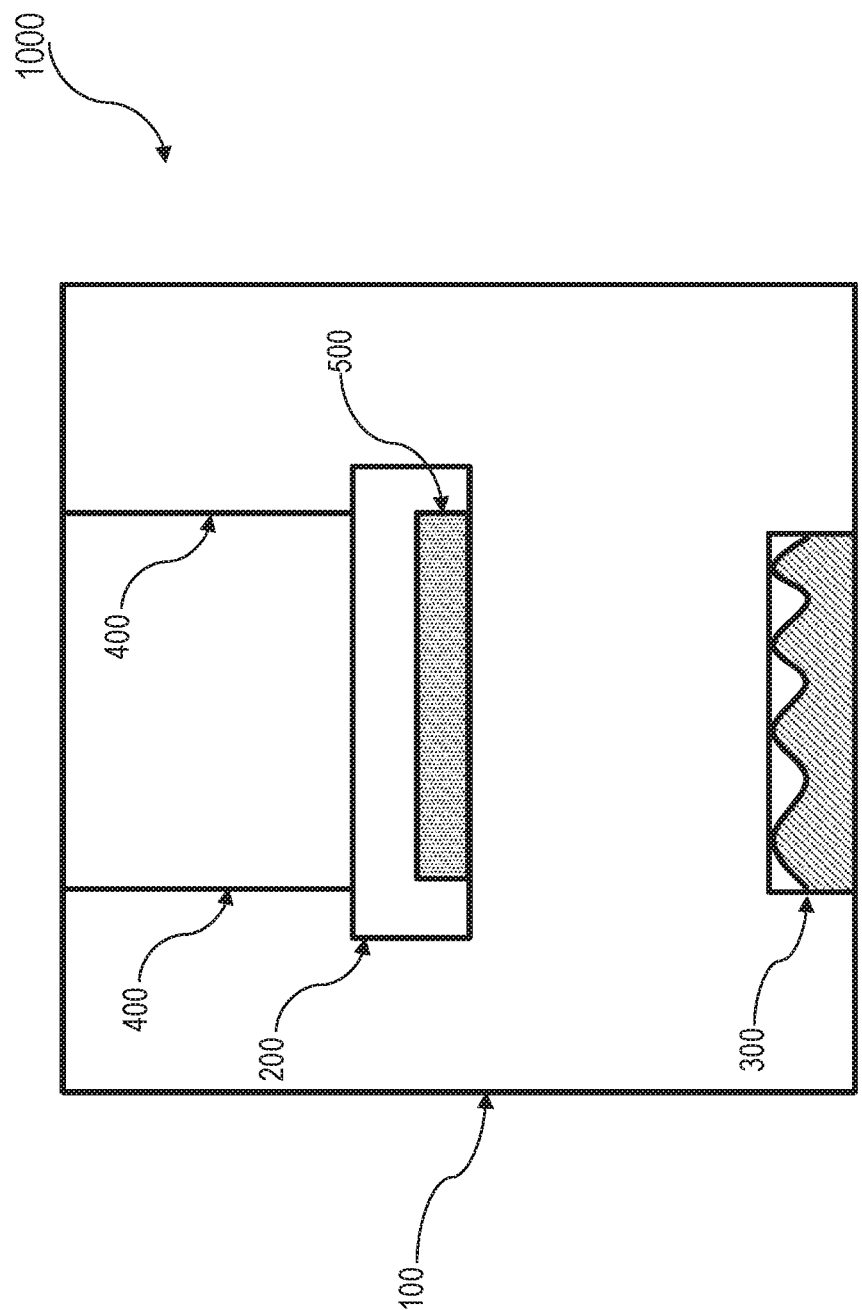

METHOD OF PRODUCING A CRACKING CATALYST

TECHNICAL FIELD

The present disclosure relates to methods of making cracking catalysts and, more specifically, to methods of making cracking catalysts, which comprise zeolite-beta.

BACKGROUND

Converting crude oil to chemicals, such as olefins and benzene, toluene, and xylene (BTX) aromatics is a growing area in the petrochemical field. This conversion process may include hydro processing feedstock. First by rejecting heavy and contaminated components. Then, upgrading the crude oil to increase the paraffinic content. The upgraded crude oil can be further directed to a steam cracking unit to produce olefins and BTX with an acceptable rate of coke formation.

In order to upgrade the crude oil for the steam cracking unit, the crude may be passed over a hydrocracking catalyst to remove undesired contents (such as sulfur, nitrogen and metals). The hydrocracking catalyst may further convert large aromatic and saturated molecules. As used herein, "large aromatic molecules" may have molecular sizes larger than 3 nanometers (nm). The catalyst used in the hydrocracking process has two functions, cracking of large hydrocarbons and hydrogenating the unsaturated molecules. However, the small pore size (less than 3 nm) of the traditional hydrocracking catalysts, such as zeolite-beta, has a negative impact on the performance of the catalyst by preventing the diffusion of large molecules from the heavy oil fraction into active sites located inside the zeolite. This causes low activity and rapid deactivation of the catalyst.

One solution to the diffusion length and pore size problem is to reduce the zeolite particle size, thereby increasing external surface area and decreasing diffusion lengths. However, while reduced particle size should lead to greatly improved catalytic activity, agglomeration of the nano-sized zeolite particles of the hydrocracking catalyst may occur, thereby preventing this improved catalytic activity.

SUMMARY

Accordingly, there is a continual need for hydrocracking catalysts and methods of making those hydrocracking catalysts, which can eliminate the agglomeration of zeolite particles and thereby improve the catalytic activity of the hydrocracking catalysts. Embodiments of the present disclosure meet this need by producing hydrocracking catalysts comprising zeolite-beta catalysts synthesized by a dry-gel method. Embodiments further meet this need by combining this dry-gel produced zeolite-beta with other hydrocracking components before calcination.

According to one embodiment of the present disclosure, a method of producing a cracking catalyst may comprise producing a plurality of uncalcined zeolite-beta nanoparticles via a dry-gel method, directly mixing the plurality of uncalcined zeolite-beta nanoparticles with at least one additional hydrocracking component to form a mixture, and calcining the mixture to form the cracking catalyst. The plurality of uncalcined zeolite-beta nanoparticles may have an average diameter of less than 100 nm.

In accordance with one embodiment of the present disclosure, producing a plurality of uncalcined zeolite-beta nanoparticles via a dry-gel method may comprise combining an alumina source, a structure directing agent, and a silica source to form a slurry; drying the slurry to form a dry-gel; and autoclaving the dry-gel in a humidified autoclave to form an uncalcined zeolite-beta.

Although the concepts of the present disclosure are described herein with primary reference to cracking catalysts, it is contemplated that the concepts will enjoy applicability to any catalytic system.

BRIEF DESCRIPTION OF THE SEVERAL VIEWS OF THE DRAWINGS

The following detailed description of specific embodiments of the present disclosure can be best understood when read in conjunction with the following drawings:

FIG. 1 shows the layout of a humidified autoclave.

ABBREVIATIONS

BET surface area=Brunauer-Emmett-Teller surface area.
° C.=degrees Celsius.
g=grams.
g/l=grams per liter.
hr.=hour.
min.=minute.
$m^2/g$=meters squared per gram.
$MoO_3$=molybdenum trioxide.
NiO=nickel oxide.
nm=nanometers.
OSDAs=organic structure-directing agents.
PSI=Pounds per square inch gauge.
rpm=revolutions per minute.
TEAOH=tetraethylammonium hydroxide.
TEOS=tetraethyl orthosilicate.
wt. %=weight percent.
°=degrees.

DETAILED DESCRIPTION

In hydrocracking, smaller catalytic particles, such as zeolite-beta nanoparticles, are theoretically desirable as smaller particles have a higher surface area to mass ratio. However, a practical limit on the size of nanoparticles is imposed by the problem of agglomeration. When small particles are placed near one another, the attractive forces can overwhelm the repulsive forces, causing multiple particles to form a single larger particle. Thus, negating the effect of the smaller particle size. As zeolite-beta nanoparticles are used in cracking catalysts, it is desirable to prevent agglomeration in the development of zeolite-beta nanoparticles.

In the formation of zeolite-beta nanoparticles according to conventional methods, this agglomeration is believed to occur primarily during the centrifuging, drying, and calcining steps. Without being limited by theory, it is believed that certain modifications will lead to decreased nanoparticle agglomeration. Specifically, those modifications are the elimination of the centrifuging step and postponing calcining until after the plurality of uncalcined zeolite-beta nanoparticles are mixed with at least one other hydrocracking component.

Embodiments of the present disclosure are directed to improved methods that decrease agglomeration. For example, a method of producing a cracking catalyst may include producing a plurality of uncalcined zeolite-beta nanoparticles via a dry-gel method. The plurality of uncalcined zeolite-beta nanoparticles may be directly mixed with at least one additional hydrocracking component to form a mixture. The mixture may then be calcined to form the cracking catalyst.

The plurality of uncalcined zeolite-beta nanoparticles may be produced via a dry-gel method. In one or more embodiments, the dry-gel method may comprise combining an alumina source, a structure directing agent, and a silica source to form a slurry; drying the slurry to form a dry-gel; and autoclaving the dry-gel in a humidified autoclave to form the plurality of uncalcined zeolite-beta nanoparticles.

Producing the plurality of uncalcined zeolite-beta nanoparticles may comprise drying the slurry to form a dry-gel. A dry-gel may include a dried mixture where the water content of the mixture is substantially equilibrated with the surrounding atmosphere. The slurry may be converted to the dry-gel by drying in an oven or under vacuum.

The water content of the dry-gel may be less than 25 wt. %. For example, the water content of the dry-gel may be less than 20 wt. %, less than 15 wt. %, less than 10 wt. %, less than 5 wt. %, or even less than 1 wt. %, or any subset thereof The slurry may be dried at a specified temperature and pressure. For example, the slurry may be dried at less than or equal to atmospheric pressure and a temperature from 80° C. to 140° C., from 90° C. to 130° C., or from 100° C. to 120° C., or any subset thereof. According to some embodiments, the slurry may be dried at less than or equal to—4 pounds per square inch of gauge pressure (PSIG) and a temperature from 80° C. to 140° C., from 90° C. to 130° C., or from 100° C. to 120° C., or any subset thereof. According to further embodiments, the slurry may be dried at less than or equal to—8 PSIG and a temperature from 80° C. to 140° C., from 90° C. to 130° C., or from 100° C. to 120° C., or any subset thereof.

The slurry may be dried for a specified period of time. For example, the slurry may be dried for from 1 hr. to 7 days, from 6 hr. to 7 days, from 12 hr. to 7 days, from 24 hr. to 7 days, from 1 hr. to 6 days, from 1 hr. to 5 days, from 1 hr. to 4 days, from 1 hr. to 3 days, from 4 hr. to 3 days, from 8 hr. to 2 days, or any subset thereof.

Drying the slurry may take place in the absence of agitation. For example, the slurry may be dried without any mixing, spinning, stirring, shaking, or other form of agitation.

The dry-gel may be autoclaved in a humidified autoclave to form an uncalcined zeolite-beta. An autoclave may include any device or combination of devices suitable to maintain a specified temperature and humidity. Referring to FIG. 1, the humidified autoclave 1000 may be a sealed chamber 100 with a sample holder 200, wherein the sealed chamber may be placed inside an oven. Specifically as shown, the humidified autoclave 1000 may comprise a sealed chamber 100. Inside the sealed chamber 100, there may be a sample holder 200. Optionally, there may be a water holder 300. The sample holder 200 may be connected to the exterior of the sealed chamber 100 by a plurality of supports 400. The dry-gel 500 may be placed in the sample holder 200.

A relative humidity in the humidified autoclave may be from 1% to 100%. For example, the relative humidity may be from 1% to 99%, from 1% to 75%, from 1% to 50%, from 25% to 100%, from 25% to 75%, from 25% to 50%, from 50% to 100%, from 50% to 75%, from 75% to 100%, from 75% to 90%, from 90% to 10%, or any subset thereof. According to some embodiments, the atmosphere within the humidified autoclave may comprise saturated steam.

According to some embodiments, the dry-gel may not be agitated during the autoclaving process. For example, the dry-gel may be autoclaved without any mixing, spinning, shaking, or stirring.

The dry-gel may be autoclaved at 100° C. to 200° C. for 1 day to 6 days. For example, the dry-gel may be autoclaved at 100° C. to 175° C., 100° C. to 150° C., 125° C. to 200° C., 125° C. to 175° C., or 125° C. to 150° C.; for 1 day to 5 days, 1 day to 4 days, 1 day to 3 days, 1 day to 2 days, 2 days to 6 days, 2 days to 5 days, 2 days to 4 days, 3 days to 6 days, or any subset thereof.

As stated above, the alumina source, structure directing agent, and silica source may be combined to form a slurry. The slurry may further comprise water or a non-aqueous solvent. According to some embodiments, the structure directing agent itself may serve as the solvent. The combining may take the form of stirring, mixing, shaking, or agitating.

The alumina source may comprise any chemical precursor capable of releasing aluminum ions or particles into the slurry. For example, the alumina source may comprise sodium aluminate, aluminum chloride, aluminum nitrate, powdered aluminum metal, powdered alumina, or any combination thereof.

Various compositions are contemplated for the structure directing agent. In one or more embodiments, the structure directing agent may comprise tetraethylammonium hydroxide (TEAOH). The structure directing agent may comprise organic structure-directing agents (OSDAs) such as organic ammonium, inorganic cations such as hydroxide, or both.

The silica source may comprise any chemical precursor capable of releasing silica into the slurry. For example, the silica source may comprise one or more of fumed silica, solid silica gel, white carbon, or tetraethyl orthosilicate (TEOS).

According to some embodiments, the dry-gel method may comprise introducing NaOH to the slurry such that the final concentration of NaOH in the slurry is from 0.000001 g/L to 0.1 g/L. For example, the final concentration of NaOH in the slurry may be from 0.000001 g/L to 0.01 g/L, from 0.000001 g/L to 0.001 g/L, from 0.000001 g/L to 0.001 g/L, or even from 0.000001 g/L to 0. 000002 g/L. In embodiments where NaOH is present, it may be preferable to have a relatively small amount of NaOH. Without being limited by theory it is believed that the presence of NaOH has detrimental effects including irregular zeolite crystal formation and large particle sizes. Another disadvantage of NaOH is when NaOH is present, further $NH_4^+$ ion exchange is required to reduce the amount of detrimental sodium in the zeolite. Thus, the yield is increased and the cost is decreased when NaOH is minimized or not present at all.

As stated previously, the plurality of uncalcined zeolite-beta nanoparticles produced by the dry-gel method may be directly mixed with at least one additional hydrocracking component to form a mixture. According to some embodiments, only a portion of the uncalcined zeolite-beta nanoparticles may be directly mixed with the at least one additional hydrocracking component. Alternatively, all of the produced uncalcined zeolite-beta nanoparticles may be directly mixed with the at least one additional hydrocracking component.

The mixture may comprise a mixture of solids, a mixture of liquids, or a mixture of some solids and some liquids. For example, the mixture may comprise a slurry, a powder mixture, an aqueous solution, a colloid, a gel, or any other mixture. According to some embodiments, the mixture may include additional solvents, such as water or a non-aqueous solvent. According to other embodiments, the mixture may not include additional solvents.

As used herein, "zeolite-beta" may refer to a hydrated alumino-silicate with a three dimensional intersecting twelve-membered ring channel system. The zeolite-beta may be characterized by X-ray diffraction (XRD). The XRD may show that zeolite-beta is present when the highest characteristic peaks are around 22.4° 2-Theta.

As used herein, "directly mixed" refers to combining the plurality of uncalcined zeolite-beta nanoparticles with the at least one additional hydrocracking component, without any processing steps which may cause agglomeration, between autoclaving the dry-gel and combining the plurality of uncalcined zeolite-beta nanoparticles with the at least one additional hydrocracking component. For example, the excluded processing steps may include one or more of calcination, centrifuging, washing, or ion-exchange.

The step of directly mixing may include any mixing step. For example, direct mixing may include mechanical mixing. The mechanical mixing may encompass extrusion, such as extrusion performed in a twin screw extruder. Mechanical mixing may take place in a static mixer, rotary mixer, mortar and pestle, extruder, or a combination of these. Directly mixing may also include other mixing steps such as impregnation. For example, directly mixing may include both extrusion and impregnation. As used herein, impregnation refers to a process wherein a metal precursor is dissolved in a solution, the catalyst support is inserted into the solution, and finally the metal precursor is drawn into the support by capillary and diffusive forces.

The at least one additional hydrocracking component may comprise one or more of $MoO_3$, $WO_3$, NiO, large pore alumina, ZSM-5, zeolite-Y, tungsten precursors, amorphous silica-alumina, and binders.

The at least one additional hydrocracking component may comprise large pore alumina. The large pore alumina may have a pore volume of 0.7 ml/g to 1.2 ml/g. For example, the pore volume may be from 0.8 ml/g to 1.1 ml/g, or from 0.9 ml/g to 1.0 ml/g. The large pore alumina may have a pore size of 18 nm to 26 nm. For example, the pore size may be from 20 nm to 24 nm. The pore volume and pore size of the large pore alumina may be calculated according to the Barret-Joyner-Halenda (BJH) method.

According to some embodiments, the cracking catalyst may comprise from 12 wt. % to 18 wt. % $MoO_3$. For example, the cracking catalyst may comprise from 14 wt. % to 18 wt. % or from 12 wt. % to 16 wt. %, or from 14 wt. % to 16 wt. % $MoO_3$.

The cracking catalyst may comprise from 2 wt. % to 8 wt. % NiO. For example, the cracking catalyst may comprise from 2 wt. % to 6 wt. %, or from 4 wt. % to 8 wt. %, or from 4 wt. % to 6 wt. % NiO.

The cracking catalyst may comprise from 10 wt. % to 50 wt. % of the uncalcined zeolite-beta nanoparticles. For example, the cracking catalyst may comprise from 10 wt. % to 40 wt. %, or from 10 wt. % to 30 wt. %, or from 10 wt. % to 20 wt. %, or from 20 wt. % to 50 wt. %, or from 20 wt. % to 40 wt. %, or from 20 wt. % to 30 wt. %, or from 30 wt. % to 50 wt. %, or from 30 wt. % to 40 wt. % of the uncalcined zeolite-beta nanoparticles.

The cracking catalyst may comprise from 0 wt. % to 40 wt. % zeolite-Y. For example, the cracking catalyst may comprise from 10 wt. % to 30 wt. %, or from 10 wt. % to 20 wt. %, or from 20 wt. % to 40 wt. %, or from 20 wt. % to 30 wt. %, or from 30 wt. % to 40 wt. % zeolite-Y.

The cracking catalyst may comprise from 0 wt. % to 20 wt. % large pore alumina. For example, the cracking catalyst may comprise from 0 wt. % to 15 wt. %, or from 0 wt. % to 10 wt. %, or from 0 wt. % to 5 wt. %, or from 5 wt. % to 15 wt. %, or from 5 wt. % to 10 wt. %, 5 wt. % to 20 wt. %, 10 wt. % to 20 wt. %, or from 10 wt. % to 15 wt. %, or from 15 wt. % to 20 wt. % large pore alumina.

The cracking catalyst may comprise from 10 wt. % to 25 wt. % of a binder. For example, the cracking catalyst may comprise from 15 wt. % to 20 wt. %, or from 10 wt. % to 20 wt. % or from 15 wt. % to 25 wt. % of a binder.

As used herein, a binder may refer to any substance capable of holding the hydrocracking components together. However, it is known that the choice of binder can have a significant effect on acidity and thus on the suitability of a zeolite based catalyst for its particular catalytic task. According to some embodiments, the binder may comprise one or more of a clay, a mineral, an alumina, or a silica. The clay may comprise kaolin. The alumina may comprise one or more of attapulgite, boehmite, or partially acid peptized alumina. According to some specific embodiments, the binder may comprise a partially acid peptized alumina. The partially acid peptized alumina may comprise small pore alumina with an alumina pore volume of 0.4 ml/g to 0.6 ml/g and a $HNO_3$/alumina molar ratio of 0.2 to 0.3.

Centrifugation, drying, and calcination are believed to be the most significant causes of agglomeration during the production of zeolite-beta nanoparticles. By eliminating or postponing these processes until after the zeolite-beta nanoparticles are mixed with the at least one other hydrocracking component, agglomeration can be greatly reduced. Without being limited by theory, it is believed that the centripetal forces of centrifugation tend to compress the nanoparticles into a smaller space, causing them to come into contact and agglomerate.

The plurality of uncalcined zeolite-beta nanoparticles may have not been subjected to centrifugation before being mixed with the at least one additional hydrocracking component. As used herein, "centrifugation" may refer to spinning in a centrifuge above 3,000 rpm, 5,000 rpm, 8,000 rpm, 10,000 rpm, 20,000 rpm, or any subset thereof.

The plurality of uncalcined zeolite-beta nanoparticles may also not have been subjected to calcination prior to being mixed with the at least one additional hydrocracking component. As used herein "calcination" may refer to exposure to temperatures above 200° C., above 300° C., above 400° C., or above 500° C.; for more than 30 minutes, more than 45 minutes, more than 60 minutes, more than 90 minutes, more than 180 minutes, more than 5 hours, more than 8 hours, more than 12 hours, more than 24 hours, more than 48 hours, or more than 5 days, or any subset thereof.

Without being limited by theory, it is believed that calcination may cause agglomeration through a process known as sintering. At elevated temperatures, diffused matter may form bridge-like structures between the surfaces.

It should be understood that the plurality of uncalcined zeolite-beta nanoparticles may not have been subjected to either centrifugation or calcination during the time between formation and mixing with the at least one other hydrocracking component. For example, the plurality of uncalcined zeolite-beta nanoparticles may not have been centrifuged or calcined after autoclaving the dry-gel and before mixing the dry-gel with the at least one other hydrocracking component. The plurality of uncalcined zeolite-beta nanoparticles may not have been centrifuged or calcined after the combining of the alumina source, the silica source, and the structure directing agent and before mixing with the at least one other hydrocracking component.

While the process of calcination may cause undesirable agglomeration before the uncalcined zeolite-beta nanoparticles have been combined with the at least one additional hydrocracking component, it is useful in the formation of a catalyst. The sintered catalyst is believed to better withstand the rigors of a chemical reactor.

The catalyst may be dried before calcination. Drying the catalyst may comprise exposing the catalyst to temperatures between 25° C. and 350° C. For example, the temperature may be between 50° C. and 325° C., 75° C. and 300° C., 100° C. and 275° C., 150° C. and 225° C., or any subset thereof. Drying the catalyst may comprise exposing the catalyst to the elevated temperatures for from 2 hr. to 24 hr. For example, the catalyst may be exposed to the elevated temperature for from 6 hr. to 20 hr., or 12 hr. to 14 hr., or any subset thereof. Without being limited by theory, it is believed that drying may be necessary to prevent steam explosions within the catalyst during calcination.

The mixture may be calcined to form the cracking catalyst. It should be understood that the mixture which may be calcined comprises both the uncalcined zeolite-beta nanoparticles and the at least one additional hydrocracking component.

The mixture may be calcined at 400° C. to 700° C., for 1 hour to 10 hours. For example, the mixture may be calcined at from 400° C. to 600° C., from 400° C. to 500° C., from 500° C. to 700° C., from 600° C. to 700° C., or from 500° C. to 600° C.; for 1 hour to 9 hours, 1 hour to 8 hours, 1 hour to 6 hours, 2 hours to 10 hours, 2 hours to 9 hours, 2 hours to 7 hours, 4 hours to 10 hours, 4 hours, to 8 hours, or 4 hours to 6 hours, or any subset thereof.

The plurality of uncalcined zeolite-beta nanoparticles may have an average diameter of less than 100 nm. For example, the plurality of uncalcined zeolite-beta nanoparticles may have an average diameter of less than 80 nm, less than 70 nm, less than 60 nm, less than 50 nm, less than 40 nm, or even less than 30 nm, or any subset thereof. It should be understood that the average diameter is the mean diameter and is to be calculated using all the uncalcined zeolite-beta nanoparticles introduced into the mixture.

The uncalcined zeolite-beta nanoparticles may have an average diameter from 20 nm to 50 nm. For example, the average diameter may be from 20 nm to 40 nm, from 20 nm to 30 nm, from 30 nm to 50 nm, from 40 nm to 50 nm, or any subset thereof.

At least 90% of the individual uncalcined zeolite-beta nanoparticles may have diameters from 20 nm to 50 nm. For example, substantially all of the zeolite-beta nanoparticles may have diameters from 20 nm to 40 nm, from 20 nm to 30 nm, from 30 nm to 50 nm, or from 40 nm to 50 nm, or any subset thereof.

A silica/alumina ratio of the uncalcined zeolite-beta nanoparticles may be from 20 to 100. For example, the silica/alumina molar ratio may be from 20 to 90, 20 to 75, 20 to 50, 20 to 40, 30 to 100, 30 to 90, 30 to 75, 30 to 50, 30 to 40, 35 to 40, 36 to 40, or any subset thereof.

An average pore size of the uncalcined zeolite-beta nanoparticles may be from 3 nm to 10 nm. For example, the average pore size of the uncalcined zeolite-beta nanoparticles may be from 3 nm to 8 nm, from 3 nm to 5 nm, from 5 nm to 10 nm, from 8 nm to 10 nm, or any subset thereof.

The surface area of both the calcined and uncalcined ZSM-5 nanoparticles may be measured using BET analysis and calculated with the multipoint BET equation. Pore volume of both the calcined and uncalcined ZSM-5 nanoparticles may be calculated from the maximum adsorption amount of nitrogen. The pore size distribution of both the calcined and uncalcined ZSM-5 nanoparticles may be determined based on the Barrett-Joyner-Halenda (BJH) method and the desorption branch of the isotherm. The average pore sizes of both the calcined and uncalcined ZSM-5 nanoparticles may be calculated by the equation $Ps=4V/S$, where $Ps$=pore size, $V$=pore volume, and $S$=surface area.

The microporous surface area of the uncalcined zeolite-beta nanoparticles may be from 300 $m^2/g$ to 500 $m^2/g$. For example, the microporous surface area of the uncalcined zeolite-beta may be from 300 $m^2/g$ to 400 $m^2/g$.

A BET surface area of the uncalcined zeolite-beta nanoparticles may be from 500 $m^2/g$ to 700 $m^2/g$. For example, the BET surface area may be from 500 $m^2/g$ to 600 $m^2/g$.

The pore volume of the uncalcined zeolite-beta nanoparticles may be from 0.8 ml/g to 0.9 ml/g. For example, the pore volume of the uncalcined zeolite-beta nanoparticles may be from 0.84 ml/g to 0.9 ml/g.

A crystallinity of the uncalcined zeolite-beta nanoparticles may be from 125% to 200%, relative to CP-814E. For example, the relative crystallinity of the uncalcined zeolite-beta nanoparticles may be from 125% to 200%, from 150% to 200%, from 170% to 190%, or any subset thereof, relative to CP-814E. CP-814E may be commercially available from Zeolyst products.

The crystallinity and phase purity of solid products may be measured by powder X-ray diffraction (XRD) using a diffractometer, such as a Rigaku Ultima IV multi-purpose diffractometer with a copper X-ray tube. The scanning range may be set between 2° to 50° in 2θ Bragg-angles with a step size of 0.04° and a total counting time of 1° per minute. The crystallinity percentage may be calculated by PANalytical High Score Plus software through the comparison of the area under the most intense diffraction peaks to that of patterns of a reference zeolite ZSM 5. The reference zeolite ZSM-5 may be a commercially available zeolite, such as CP-814E.

The calcined mixture may include a plurality of zeolite-beta nanoparticles incorporated within the calcined mixture. The plurality of zeolite-beta nanoparticles incorporated within the calcined mixture may have an average diameter of less than 100 nm. For example, the plurality of zeolite-beta nanoparticles may have an average diameter of less than 80 nm, less than 70 nm, less than 60 nm, less than 50 nm, less than 40 nm, or even less than 30 nm, or any subset thereof.

The plurality of zeolite-beta nanoparticles incorporated within the calcined mixture may have an average diameter from 20 nm to 50 nm. For example, the average diameter may be from 20 nm to 40 nm, from 20 nm to 30 nm, from 30 nm to 50 nm, from 40 nm to 50 nm, or any subset thereof.

Particle sizes may be measured by transmission electron microscopy (TEM). The TEM may be operated at about 200 kV. The average particle sizes may be obtained by measuring all the particles in 5 to 8 TEM images and taking the mean.

At least 90% of the individual zeolite-beta nanoparticles incorporated within the calcined mixture may have diameters from 20 nm to 50 nm. For example, substantially all of the zeolite-beta nanoparticles may have diameters from 20 nm to 40 nm, from 20 nm to 30 nm, from 30 nm to 50 nm, or from 40 nm to 50 nm, or any subset thereof.

An average pore size of the plurality of zeolite-beta nanoparticles incorporated within the calcined mixture may be from 3 nm to 10 nm. For example, the average pore size of the plurality of zeolite-beta nanoparticles incorporated within the calcined mixture may be from 3 nm to 8 nm, from 3 nm to 5 nm, from 5 nm to 10 nm, from 8 nm to 10 nm, or any subset thereof. The average pore size may be determined using a gas absorption analyzer, such as the Quantachrome Autosorb iQ.

The microporous surface area of the plurality of zeolite-beta nanoparticles incorporated within the calcined mixture may be from 300 m$^2$/g to 500 m$^2$/g. For example, the microporous surface area of the zeolite-beta may be from 300 m$^2$/g to 400 m$^2$/g.

A BET surface area of the plurality of zeolite-beta nanoparticles incorporated within the calcined mixture may be from 500 m$^2$/g to 700 m$^2$/g. For example, the BET surface area may be from 500 m$^2$/g to 600 m$^2$/g, or from 550 m$^2$/g to 650 m$^2$/g.

The pore volume of the plurality of zeolite-beta nanoparticles incorporated within the calcined mixture may be from 0.8 ml/g to 0.9 ml/g. For example, the pore volume of the zeolite-beta nanoparticles incorporated within the calcined mixture may be from 0.84 ml/g to 0.9 ml/g.

A crystallinity of the plurality of zeolite-beta nanoparticles incorporated within the calcined mixture may be from 125% to 200%, relative to CP-814E. For example, the relative crystallinity of the plurality of zeolite-beta nanoparticles incorporated within the calcined mixture may be from 150% to 200%, from 175% to 200%, from 170% to 190%, or any subset thereof.

An impregnated cracking catalyst support may be prepared by impregnating the cracking catalyst with metal compounds after the mixture is calcined to form an impregnated cracking catalyst support. The metal compounds may include any catalytically active metal. For example, the metal compounds may include W, Ni, Mo, Cr, Mn, Fe, Co, V, Cu, Zn, Ga, Ge, Sn, Cd, Ag, Pd, Rh, Ru, Nb, Zr, Ga, or a combination of these. According to some embodiments, the metal compounds may include one or both of W and Ni.

The impregnated cracking catalyst support may be prepared by inserting the calcined cracking catalyst into an impregnation solution. The impregnation solution may comprise metal precursor compounds which disassociate in the solution to form metals or metal ions. For example, an impregnation solution may comprise ammonium metatungstate and nickel nitrate.

After impregnation, the impregnated cracking catalyst support may be further calcined to form an impregnated cracking catalyst. Without being limited by theory, calcination may be used to drive off remaining volatile compounds such as ammonium and water. The impregnated cracking catalyst support may be calcined at 400° C. to 700° C. for 1 hour to 10 hours. For example, the impregnated cracking catalyst support may be calcined at 400° C. to 600° C., 400° C. to 500° C., 500° C. to 700° C., 600° C. to 700° C., or 500° C. to 600° C.; for 1 hour to 9 hours, 1 hour to 8 hours, 1 hour to 6 hours, 2 hours to 10 hours, 2 hours to 9 hours, 2 hours to 7 hours, 4 hours to 10 hours, 4 hours, to 8 hours, or 4 hours to 6 hours, or any subset thereof.

EXAMPLES

Exemplary cracking catalysts were prepared according to a conventional method and according to the present method. Both catalysts had a composition of 15 wt. % MoO$_3$, 5 wt. % NiO, 10 wt. % large pore alumina, 20 wt. % partially acid peptized alumina binder, and 50 wt. % of the zeolite-beta nanoparticles characterized in table 1.

Comparative Example 1

In COMPARATIVE EXAMPLE 1, a zeolite-beta based catalyst was prepared according to the traditional hydrogel method. 0.27 g aluminum powder was mixed with 25 g of TEAOH and stirred. In a separate container, 15 g fumed silica was mixed with 38 g of TEAOH and 4.05 g water. The two solutions were mixed together and the mixture was stirred at room temperature for 4 hours. The liquid mixture was then placed in an autoclave and spun at 60 RPM and 140° C. for three days. After three days, a colloid was formed. The colloid was repeatedly spun in a high speed centrifuge and washed with water until the pH was 9.0. The solid product was then dried in an oven at 110° C. overnight. The dried sample was calcined at 550° C. for 4 hours and is characterized in Table 1.

The calcined product was then mixed with appropriate amounts of MoO$_3$, NiO, large pore alumina, and partially acid peptized alumina binder, to form a mixture. The mixture was then extruded into a shaped catalyst (the shape was 1.8 mm cylinders). The shaped catalyst was then dried at 110° C. overnight. Finally, the dried sample was calcined at 550° C. for 4 hours.

Inventive Example 1

In INVENTIVE EXAMPLE 1, a zeolite-beta based catalyst was prepared according to the present, modified, dry-gel method. 0.27 g alumina powder was mixed with 12.5 g of TEAOH. In a separate container, 7.5 g of fumed silica was mixed with 19 g of 35% TEAOH and 2.0 g of water. The two solutions were mixed together to form a slurry. The slurry was stirred at room temperature for 4 hours. The slurry was then dried in an oven at 110° C. overnight. The sample was placed in an autoclave with about 30 ml of water, the autoclave was sealed and held at 140° C. for three days. The resulting uncalcined zeolite-beta is characterized in Table 1.

The uncalcined zeolite-beta product was mixed with appropriate amounts of MoO$_3$, NiO, large pore alumina, and partially acid peptized alumina binder to form a mixture. The mixture was then extruded into a shaped catalyst (the shape was 1.8 mm cylinders). The shaped catalyst was dried at 110° C. overnight. Finally, the dried sample was calcined at 500° C. for 4 hours.

It should be understood that the catalyst of INVENTIVE EXAMPLE 1 as characterized in Table 1 has not been calcined. The catalyst of COMPARATIVE EXAMPLE 1, as characterized in Table 1 has been calcined.

TABLE 1

Zeolite-Beta Characterization

| | COMPARATIVE EXAMPLE 1 | INVENTIVE EXAMPLE 1 |
| --- | --- | --- |
| Particle sizes (nm) | 90 | 30 |
| SiO$_2$/Al$_2$O$_3$ molar ratio | 35 | 37 |
| Synthesis Yield (wt. %) | 65 | 95 |
| XRD phase | Beta | Beta |
| Crystallinity (CP-814E as reference) (%) | 102 | 187 |
| BET surface area (m$^2$/g) | 590 | 600 |
| Microporous Surface Area (m$^2$/g) | 284 | 347 |
| Mesoporous Surface Area (m$^2$/g) | 306 | 253 |
| Pore Volume (ml/g) | 0.83 | 0.85 |
| Microporous Volume (ml/g) | 0.15 | 0.18 |
| Mesoporous Volume (ml/g) | 0.68 | 0.67 |
| Average pore size (nm) | 2.8 | 5.7 |
| Mesopore percentage | 82 | 79 |

As is shown in Table 1, INVENTIVE EXAMPLE 1 had increased synthesis yields and crystallinity relative to COMPARATIVE EXAMPLE 1. Further, the catalyst of INVEN- TIVE EXAMPLE 1 had smaller particle sizes relative to COMPARATIVE EXAMPLE 1 (30 nm vs 90 nm).

It was discovered through TEM images that when the uncalcined nano-sized zeolite particles are directly mixed with the at least one additional hydrocracking component, no aggregation occurs.

Catalytic Testing

To determine the difference between the two catalysts, a pilot plant scale hydrocracking process was performed. The feed (hydrotreated Arab light crude) is characterized in Table 2. The conditions were temperature=390° C., liquid hourly space velocity=1.5 $h^{-1}$, pressure=150 bar, $H_2$/oil volume ratio=1200:1. The testing results are summarized in Table 3.

TABLE 2

Feed properties

| | |
|---|---|
| Density (g/ml) | 0.8389 |
| S, ppm (weight) | 53 |
| N, ppm (weight) | 75 |
| Feed Composition, wt. % | |
| $C_5$-180° C. | 17.0 |
| 180° C.-350° C. | 37.9 |
| 350° C.-540° C. | 32.7 |
| >540° C. | 13.6 |

TABLE 3

Reaction performance comparison

| Catalyst | COMPARATIVE EXAMPLE 1 | INVENTIVE EXAMPLE 1 |
|---|---|---|
| Liquid product properties | | |
| Density, g/ml | 0.8288 | 0.7903 |
| S, ppm (weight) | 28.4 | 7.0 |
| N, ppm (weight) | 15.5 | 1.2 |
| Product Yields, wt. % | | |
| $C_1$-$C_4$ | 7.3 | 8.5 |
| $C_5$-180° C. | 21.8 | 51.9 |
| 180° C.-350° C. | 39.8 | 33.9 |
| 350° C.-540° C. | 21.5 | 6.2 |
| >540° C. | 1.9 | 0 |

One distinction between COMPARATIVE EXAMPLE 1 and INVENTIVE EXAMPLE 1 is that in COMPARATIVE EXAMPLE 1, the zeolite-beta is centrifuged and calcined before mixing with the other hydrocracking components. In contrast, the zeolite-beta of INVENTIVE EXAMPLE 1 is neither centrifuged nor calcined before introduction to the other hydrocracking components.

As is shown in Table 3, the catalyst of INVENTIVE EXAMPLE 1 completely converts the >540° C. fraction. The catalyst of COMPARATIVE EXAMPLE 1 cannot accomplish this conversion. Additionally, the inventive catalyst produces a significantly higher light gas fraction (light gas fraction may be defined as compounds ranging from Cs to those having a boiling point of 180° C.) than the comparative catalyst. Further, the catalyst of INVENTIVE EXAMPLE 1 is significantly better at reducing the quantity of nitrogen and sulfur compounds in the final product, relative to the catalyst of COMPARATIVE EXAMPLE 1.

It is also noted that recitations herein of "at least one" component, element, etc., should not be used to create an inference that the alternative use of the articles "a" or "an" should be limited to a single component, element, etc.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of producing a cracking catalyst, the method comprising:
    producing a plurality of uncalcined zeolite-beta nanoparticles via a dry-gel method, wherein the plurality of uncalcined zeolite-beta nanoparticles has an average diameter of less than 100 nm;
    directly mixing the plurality of uncalcined zeolite-beta nanoparticles with at least one additional hydrocracking component to form a mixture; and
    calcining the mixture to form the cracking catalyst;
    wherein the plurality of uncalcined zeolite-beta nanoparticles has not been subjected to centrifugation before being mixed with the at least one additional hydrocracking component.

2. The method of producing a cracking catalyst of claim 1, wherein the plurality of uncalcined zeolite-beta nanoparticles has not been subjected to centrifugation above 3,000 rpm, before being mixed with the at least one additional hydrocracking component.

3. The method of producing a cracking catalyst of claim 1, wherein the plurality of uncalcined zeolite-beta nanoparticles has not been subjected to calcination above 200° C. for more than 30 minutes, before being mixed with the at least one additional hydrocracking component.

4. The method of producing a cracking catalyst of claim 1, wherein the at least one additional hydrocracking component comprises one or more of $MoO_3$, $WO_3$, NiO, large pore alumina, ZSM-5, zeolite-Y, tungsten precursors, amorphous silica-alumina, and binders.

5. The method of producing a cracking catalyst of claim 1, wherein the cracking catalyst comprises from 14 wt. % to 16 wt. % $MoO_3$, 4 wt. % to 6 wt. % NiO, 10 wt. % to 50 wt. % of the zeolite-beta nanoparticles, 0 wt. % to 40 wt. % zeolite-Y, 0 wt. % to 20 wt. % large pore alumina, and 15 wt. % to 20 wt. % of a binder.

6. The method of producing a cracking catalyst of claim 1, wherein the mixture is calcined at 400° C. to 700° C. for 1 hour to 10 hours.

7. The method of producing a cracking catalyst of claim 1, wherein the directly mixing comprises extrusion.

8. The method of producing a cracking catalyst of claim 1, wherein the directly mixing comprises both extrusion and impregnation.

9. The method of producing a cracking catalyst of claim 1, wherein the cracking catalyst is impregnated with metal compounds after the mixture is calcined to form an impregnated cracking catalyst support.

10. The method of producing a cracking catalyst of claim 9 wherein the impregnated cracking catalyst support is further calcined.

11. The method of producing a cracking catalyst of claim 1, wherein the plurality of uncalcined zeolite-beta nanoparticles has an average diameter from 20 nm to 50 nm.

12. The method of producing a cracking catalyst of claim 1, wherein at least 90% of the plurality of uncalcined zeolite-beta nanoparticles have diameters from 20 nm to 50 nm.

13. The method of producing a cracking catalyst of claim 1, wherein an average pore size of the plurality of uncalcined zeolite-beta nanoparticles is from 3 nm to 10 nm.

14. The method of producing a cracking catalyst of claim 1, wherein a microporous surface area of the plurality of uncalcined zeolite-beta nanoparticles is from 300 $m^2/g$ to 500 $m^2/g$.

15. The method of producing a cracking catalyst of claim 1, wherein a BET surface area of the plurality of uncalcined zeolite-beta nanoparticles is from 500 $m^2/g$ to 700 $m^2/g$.

16. The method of producing a cracking catalyst of claim 1, wherein a pore volume of the plurality of uncalcined zeolite-beta nanoparticles is from 0.8 ml/g to 0.9 ml/g.

17. The method of producing a cracking catalyst of claim 1, wherein the producing the plurality of uncalcined zeolite-beta nanoparticles via the dry-gel method comprises:
    combining an alumina source, a structure directing agent, and a silica source to form a slurry;
    optionally, introducing NaOH to the slurry such that the final concentration of NaOH in the slurry is from 0.000001 g/L to 0.1 g/L;
    drying the slurry to form a dry-gel; and
    autoclaving the dry-gel in a humidified autoclave to form an uncalcined zeolite-beta.

18. The method of producing a cracking catalyst of claim 17, wherein the water content of the dry-gel is less than 25 wt. %.

19. The method of producing a cracking catalyst of claim 17, wherein the dry-gel is not agitated during autoclaving.

* * * * *